April 5, 1927.
R. BECK
WATER CIRCULATOR AND AIR MOISTENER FOR WATER COOLED
INTERNAL COMBUSTION ENGINES
Filed Jan. 12, 1925
1,623,229
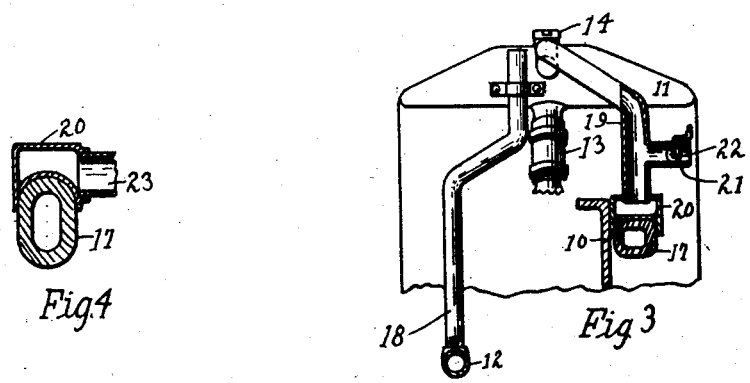
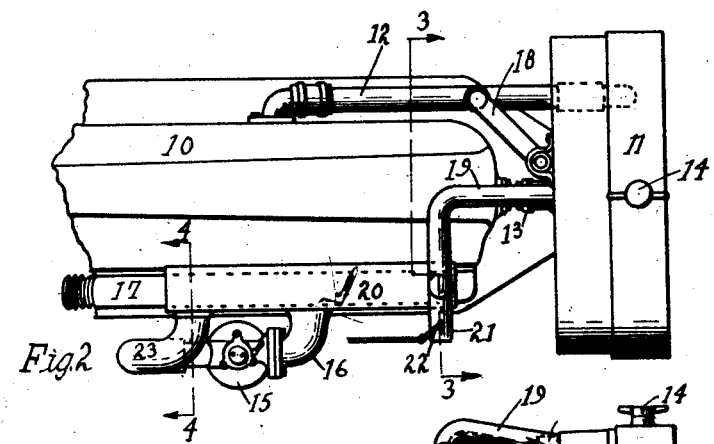
Inventor
Riley Beck
by Oning & Hague Attys.

Patented Apr. 5, 1927.

1,623,229

UNITED STATES PATENT OFFICE.

RILEY BECK, OF DOWS, IOWA.

WATER CIRCULATOR AND AIR MOISTENER FOR WATER-COOLED INTERNAL-COMBUSTION ENGINES.

Application filed January 12, 1925. Serial No. 1,979.

The object of my invention is to provide an apparatus of simple, durable and inexpensive construction that may be used in the nature of an attachment, to be applied to water cooled internal combustion engines such as are commonly employed in automobiles, for the purpose of jointly producing, as co-ordinated steps of a single operation, the following desirable and advantageous results: First, establishing a forced and continuous circulation of the water in the water jacket and radiator; second, removing dust and impurities from the air being supplied to the carburetor; and third, applying moisture and heat for vaporizing same to the air supplied to the carburetor.

My invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of an automobile engine and radiator with my apparatus applied thereto.

Figure 2 shows a top or plan view of same.

Figure 3 shows an enlarged, detail, sectional view on the line 3—3 of Figure 2; and Figure 4 shows a detail sectional view on the line 4—4 of Figure 2.

Referring to the accompanying drawings, I have used the reference numeral 10 to indicate an automobile engine of the water cooled type, 11 a radiator connected with the water jacket by the usual pipe 12 leading from the bottom of the radiator to the water jacket, and the pipe 13 leading from the top of the water jacket to the top of the radiator. The top of the radiator is provided with the usual screw cap 14, but with my attachment it is necessary to close all air vents in the top of the radiator.

The carburetor is indicated by the numeral 15 and leads to the intake manifold 16. The exhaust manifold is marked 17. All of the parts just described are of the ordinary construction and may be of the kind used on Ford automobiles.

With my improved apparatus, I add to the parts described the following devices: On the water pipe 12 I apply an upright open-ended pipe 18 extended to a point above the water level of the radiator and communicating with the pipe 12 at the lower end.

Comunicating with the top of the radiator is a pipe 19 which extends preferably first rearwardly and upwardly and downwardly into a heater jacket 20 mounted in any suitable manner upon the exhaust manifold. In the pipe 19 is an open-ended intake pipe 21 provided with a butterfly valve 22 by which the amount of air admitted into the pipe 21 may be regulated. This valve is normally closed and is preferably manually opened when starting with a cold engine. Leading from the rear end of the heater is an air pipe 23 communicating with the carburetor 15. The opposite side of the carburetor leads to the air intake manifold 16 in the ordinary manner.

In practical use, and assuming that the device was assembled as set forth, and that the engine was in operation, then the intake stroke of each piston creates a strong suction on the intake manifold and carburetor, which results in supplying liquid fuel from the carburetor. In addition, this suction also withdraws air from the heater 20, thus creating a partial vacuum which in turn withdraws air from the top of the radiator through the pipe 19, which is preferably inclined as shown to permit any water that may splash into it from the radiator to drain back to the radiator. The foregoing action also creates a partial vacuum in the top of the radiator, and since the radiator is closed except for the water circulating pipe 13, this vacuum must be filled through the pipe 13. This I accomplish by providing the pipe 18 with its upper end open to the air which is drawn through it and passes through the water jacket and pipe 13 to the top of the radiator.

When the engine is at rest, the level of the water in the pipe 18 is that of the radiator, but when the engine is in operation, the level is lowered to a point adjacent to the point where the pipe 18 enters the pipe 12 with the result that, during the fluctuation in the vacuum pull caused by intermittent action of the pistons, there will be successively drawn into the rear end of the pipe 12 a quantity of air through the pipe 18, and a quantity of water through the forward end of the pipe 12, thus forming bubbles of air traveling toward the top of the radiator each of which will force ahead of it a quantity of water, and hence a forced circulation of water will be established and maintained. This method of circulating water has many advantages over either the water pump or the gravity system now in use. There are no working parts to get out of order or require lubrication. These is no leakage of water, and yet a positive moving water circulation is maintained.

The same apparatus that causes the forced water circulation also produces other desirable results, since all of the air that enters the engine must pass through the water jacket, this air is thereby washed and all dust or foreign substances removed. In addition to this, a certain amount of moisture is taken up by the air also, since the air admitted to the jacket is much cooler than the water in the jacket, the water is proportionately heated with mutually advantageous results.

By adding the heating jacket over the exhaust manifold, I attain several advantageous results; superheated air is supplied to the carburetor, which aids vaporization of the fuel, and in the event that any water should enter the heater with the air or condense in the air pipes, this will be vaporized in the heater, and thereby prevented from entering the engine.

In practice, I have found that my improved means for circulating the water and at the same time air cooling it, maintains the engine at a temperature for maximum efficiency under conditions where an ordinary water pump or gravity circulator system would boil. Furthermore, the removal of dirt and the addition of moisture to the air tends to minimize the formation of carbon or other deposits within the cylinders, and to promote more complete combustion of the fuel, thus increasing the life and efficiency of the engine.

I claim as my invention:

The combination with an internal combustion engine including a water jacket, a carburetor, air intake and a radiator, the latter being closed at its top, of a water pipe communicating between the bottom of the radiator and the water jacket, an air inlet pipe communicating with said water pipe at a point between the radiator and jacket and extended upwardly to a point above the water level of the radiator, a water pipe communicating between the top of the water jacket and the top of the radiator, an air pipe communicating with the top of the radiator and extended first upwardly and rearwardly and then downwardly and communicating with the carburetor air intake, and a manually controlled air valve in said latter air pipe, for the purposes stated.

Des Moines, Iowa, December 16, 1924.

RILEY BECK.